Nov. 1, 1938.    M. A. SCHEG    2,134,956
ALTERNATING CURRENT RELAY
Filed April 25, 1936
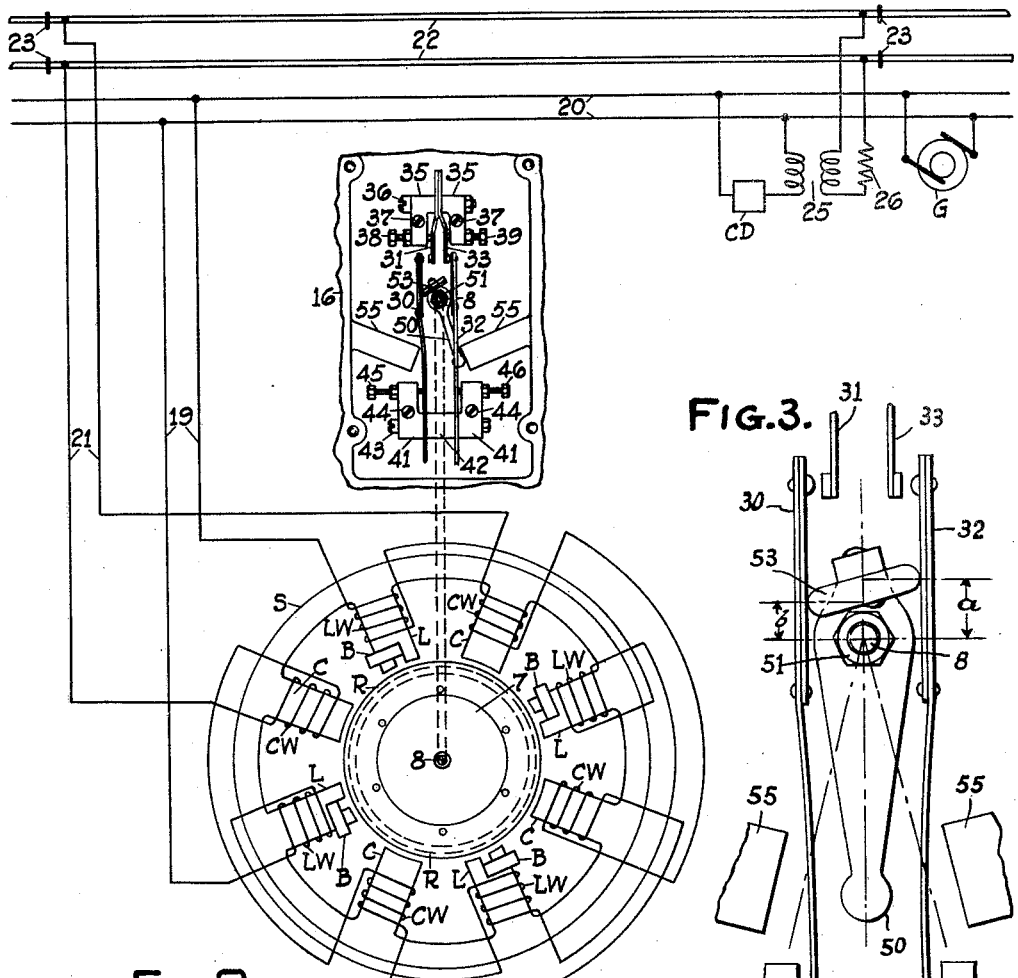
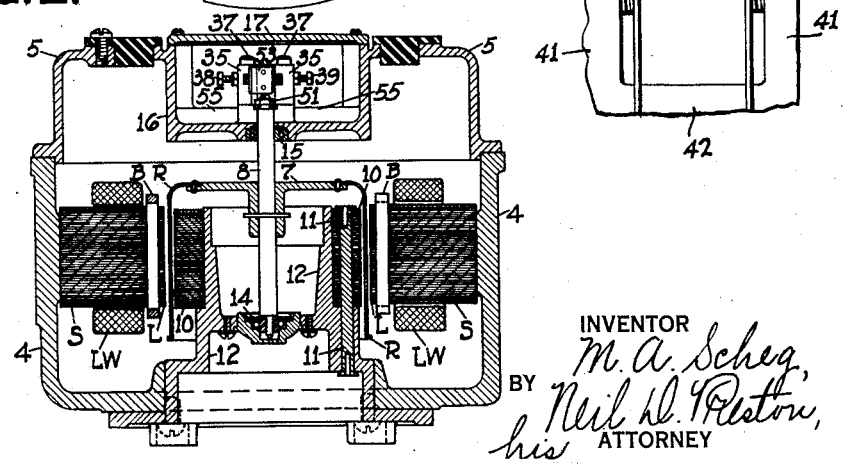
INVENTOR
M. A. Scheg,
BY Neil D. Preston,
his ATTORNEY Patented Nov. 1, 1938

2,134,956

UNITED STATES PATENT OFFICE 2,134,956

ALTERNATING CURRENT RELAY

Marcian A. Scheg, Rochester, N. Y., assignor to General Railway Signal Company, Rochester, N. Y.

Application April 25, 1936, Serial No. 76,405

11 Claims. (Cl. 175—320)

This invention relates in general to relays, and more particularly to an alternating current relay of the two element type particularly adapted to operate its armature in response to a series of pulses of alternating current; each pulse comprising a group or train of current waves of alternate polarity at the frequency of the controlled source.

It is proposed, in accordance with the present invention, to provide a relay responsive to alternating current energization and particularly adapted to operate its contacts in accordance with spaced impulses of alternating current. More specifically, it is proposed to provide an alternating current relay, suitable for coded alternating current track circuit operation or the like, in which the biasing force, operating the armature to its deenergized position, is provided by electro-magnetic reaction, and is of uniform intensity throughout the armature travel. Since the biasing force is developed by electro-magnetic reaction, it is unaffected by extraneous vibrations and provides a uniformly accelerated motion to the rotor.

Other objects, purposes and characteristic features of the present invention will be apparent as the description thereof progresses, during which references will be made to the accompanying drawing, in which—

Fig. 1 is a plan view of a relay arranged according to the present invention with certain parts removed and with the contact arrangement shown as projected above the illustrated operating structure. The relay in Fig. 1 is illustrated diagrammatically as applied to an alternating current coded track circuit.

Fig. 2 is an elevational sectional view of the relay shown in Fig. 1.

Fig. 3 is a fragmentary view of the contact making parts of the relay shown in mid position.

In Fig. 1 of the accompanying drawing, the magnetic structure of the present relay has been illustrated in a rather simplified manner as an eight salient pole stator S which may be made up of suitable laminations in the usual manner. The housing for the stator has been omitted in Fig. 1, but as may be seen in Fig. 2, the laminated stator S may be carried by a suitable cylindrical case 4 having a top cover member 5. The stator S surrounds a cup shaped rotor R carried by an upper hub member 7 attached to a vertical shaft 8. The rotor R is preferably of aluminum, brass or other non-magnetic current conducting material, and surrounds a center stationary core comprising rings of magnetic laminations 10 held by rivets 11 to a hollow cylindrical supporting member 12 removably carried in a recess in the bottom of case 4. A horizontal web in the core supporting member 12 carries the lower end of shaft 8 by an anti-friction thrust bearing 14. The upper end of shaft 8 extends through an anti-friction bearing 15 in a contact housing 16, which contact housing 16 is formed by a center depressed portion of the cover member 5 and is enclosed by a removable top plate 17.

The stator S includes four poles L carrying windings LW which are constantly energized by alternating current to provide what may be termed the local relay magnetization, and spaced between the poles L are four poles C carrying windings CW which are energized by the operating or control alternating current and consequently provide what may be termed the control relay magnetization. In the illustrated application of the present relay, the local windings LW are constantly energized from a power line circuit 20 over wires 19, which line circuit is energized with alternating current of a suitable frequency such as by a generator G. The control windings CW however, are illustrated as connected across railway track rails 22 by wires 21, the rails 22 being insulated from the adjacent track by insulated joints 23 to form the usual track circuit section. The other ends of rails 22 are connected to the secondary of a track transformer 25 in series with a current limiting unit 26. The primary of transformer 25 is connected to the power line 20 through a suitable coder or interrupter CD.

The coder CD may be of the usual type in which contacts are operated at a plurality of different rates by a constant speed motor or the like, whereby the track circuit including the control relay windings CW is energized with impulses of alternating current, at a rate (number per minute) which is selected in accordance with traffic conditions to provide a coded track circuit system.

The windings LW on the stator S are so arranged that the usual four pole field is formed wherein adjacent poles L are of opposite polarity and produce flux passing through the rotor R and the inner stationary core 10. The ends of the local poles L however are split as shown with a short-circuited shading band B of copper, aluminum or the like arranged within these slots to surround only one portion of each of the poles L. In this manner, the flux through the portion of the pole L surrounded by the shading band B is retarded in the usual manner so that a certain phase displacement is produced between the flux maxima in the two portions of each pole L.

It will be seen in Fig. 1 that the shading bands B are all arranged on the same relative portions of poles L. That is, in looking at the ends of poles L, the bands B surround the left hand portion of each pole whereby it will be clear that the flux in this shaded pole portion lags the flux in the right hand portion to form a field rotating in a counter clock-wise direction when alternating current is flowing in windings LW. This local magnetic field, rotating in a counter clockwise direction, then cuts the rotor R and induces eddy currents therein which react therewith in the usual manner to produce a torque tending to rotate the rotor R in a counter clock-wise direction.

The control windings CW are arranged on the stator S in a very similar manner to windings LW, or that is, these windings CW are arranged to form the usual four pole magnetic field wherein adjacent poles C are of opposite polarities to produce flux passing through rotor R and the inner stationary core 10. The energization with alternating current of windings CW alone does not produce a rotating magnetic field, but in accordance with the usual practice in two element alternating current relays, the energizing current of the control windings CW is displaced in phase with respect to the energizing current of the local windings LW. This phase displacement may be caused either by the inherent characteristics of the windings CW and their energizing current or by an auxiliary means such as the current limiting unit 26 in the energizing circuit.

In the present instance it will be considered that the current limiting unit 26 is a reactance, impedance or the like, which together with the track circuit characteristics and the inherent characteristics of windings CW causes the current in windings CW to lag the local current in windings LW. Under these conditions a magnetic field rotating in a clock-wise direction is produced by the combined energization of the local winding LW and the control windings CW, and develops a clock-wise torque to the rotor R.

Thus the energization of the local winding LW alone produces a counter clock-wise torque to rotor R due to the shading bands B, but, when both windings LW and CW are energized a torque in a clock-wise direction is produced, and it is intended to so proportion the various parts of the present relay that this clock-wise torque is sufficient to overcome the counter clock-wise torque produced by windings LW alone, and thereby cause rotation of the rotor R in a clock-wise direction. Consequently when the coder CD energizes the control windings CW over the track circuit, the rotor R is operated in a clock-wise direction, and when windings CW are deenergized by the coder or by a train shunting rails 22, the continuously energized local winding LW is effective to operate the rotor R in a counter clock-wise direction, thereby providing oscillatory rotation of the rotor R by intermittent energization of the control windings CW without the use of a mechanical biasing means.

One form of contact means which may be operated by the rotor R is shown in Fig. 1 as projected above the stator S and indicated as connected to the shaft 8 by dotted lines, it being understood that these contacts are to be located in the contact housing 16 as shown in Fig. 2. This contact arrangement comprises an energized or front contact finger 30 biased to engage a contact point on a fixed contact finger 31, and a similar deenergized or back contact finger 32 is biased to engage a contact point on a contact finger 33.

The fixed contact fingers 31 and 33 converge at their outer ends to form a general fork-shaped member which is carried between two insulating blocks 35 by an insulated through-bolt 36, the insulating blocks 35 being attached to the bottom of housing 16 by screws 37. The normal position of the end of each of the fixed contact fingers 31 and 33 is individually adjustable by respective screws 38 and 39 threaded through the insulating blocks 35. The outer ends of the front and back contact fingers 30 and 32 are clamped between outer insulating blocks 41 and a center insulating block 42 by an insulated through-bolt 43, the outer insulating blocks 41 being attached to the bottom of housing 16 by screws 44. The tension of the front and back contact fingers 30 and 32 is likewise individually adjustable by screws 45 and 46 respectively threaded through the insulating blocks 41.

The contact fingers are all raised slightly above the bottom of the housing 16 and a cross arm 50 is attached to the upper end of shaft 8 by jam nuts 51 to operate beneath the contact fingers and above the bottom of housing 16. One end of the cross arm 50 is up-turned between the front and back contact fingers 30 and 32 and carries an insulating pusher 53 engaging reenforcing plates attached to the inside of contacts 30 and 32. The pusher 53 is shown as engaging front contact 30 whereby this contact is disengaged from the fixed contact 31 in accordance with the counter-clockwise rotated position of rotor R resulting from the deenergization of the control windings CW. It will of course be obvious that the pusher 53 is operated in a clockwise direction from its illustrated position by the energization of the control winding CW to allow front contact finger 30 to engage fixed contact 31 and to operate back contact finger 32 away from fixed contact 33. These contact fingers may be connected to control the usual decoding circuits or other apparatus to be controlled by the alternating current track relay in the usual manner.

The portion of the cross arm 50 extending in the opposite direction from shaft 8 forms a stop arm passing beneath contact fingers 30 and 32, which stop arm engages webs 55 formed in the bottom of housing 16 whereby to limit the rotated position of rotor R in each direction. In order to prevent rebounding or bobbing of the rotor assembly when this stop arm engages the webs 55, the rotor R may be frictionally mounted on the shaft 8 in the manner clearly shown and described in Patent No. 1,480,276, granted to R. C. Leake, January 8, 1934. Such a friction coupling means allows the rotor R to continue to rotate after the shaft has been stopped by the stop arm engaging the webs 55, thereby holding the shaft in its extreme position until the kinetic energy of the rotor R has been absorbed by the frictional coupling means.

It will be noticed in Fig. 1 and Fig. 3, that the pusher 53 is not mounted on the up-turned end of cross arm 50 at right angles to its operating moment arm, but rather this pusher 53 is tilted, to the left, at such an angle that its effective moment arm $a$ when operating back contact 32 is greater than its effective moment arm $b$ when operating front contact 30. Such an arrangement tends to provide more desirable operating characteristics of the relay as the biasing force exerted by the front contact finger 30 on the rotor R, operating through arm *b*, when in its deenergized position, is less than the biasing force exerted by back contact 32 operating through longer arm *a*, on the rotor R when in its energized position, thereby permitting a smaller counter clockwise magnetic torque produced by the local energization of windings LW to effectively hold the rotor R in its deenergized position. In other words, by tilting pusher 53, the load curve on the relay can be adjusted to match the torque curve of the relay.

A two element alternating current relay has thus been provided in which one element comprises a constantly energized field winding producing a rotating magnetic field biasing the rotor in one direction, which continuously rotating field is employed in combination with a control magnetic field which when energized in proper phase relationship to the continuously energized field produces a rotating field in the opposite direction to provide a torque overcoming the biasing torque and operating the rotary armature into its energized position. In this manner a mechanical biasing means is not required to operate the rotary armature to its deenergized position when the control windings are deenergized, which feature permits more efficient armature operation in response to impulses of control current as the biasing means ordinarily employed in connection with armatures of this type possesses considerable inertia limiting the speed at which the relay can operate. It will also be clear that the present biasing means exerts a constant biasing force throughout the armature travel which is not affected by jars or vibrations.

The present relay also has the feature of operating in response to only one polarity of energization, or that is, the front or energized contacts can be closed only by properly connecting the control windings CW to the source of energy as it will be clear that if alternating current were connected in a reverse sense to the control windings CW, the only effect would be an increase in the biasing torque tending to close the back or deenergized contacts. This feature is of course valuable in coded track circuit operation as the polarity of energy of adjacent track circuits is alternated or staggered whereby "broken down" insulating joints cannot improperly cause operation of one track relay by the energization applied to the adjacent section.

In describing the present invention, attention has been directed to one specific embodiment thereof, without attempting to point out the various alternate or optional features of construction, or the different organizations or combinations that may be employed. For example, the present invention is not limited to a salient pole stator, as the stator S could be the usual non-salient pole type having distributed windings for both the local and control windings. It will also be clear that although shading bands B have been shown to obtain a rotating biasing field by split phase flux, such a rotating field could also be provided by employing an auxiliary local winding having a displaced phase relationship to a main local winding, as the starting winding of a single phase induction motor.

In other words, the particular embodiment of the present invention has been selected to facilitate in the disclosure thereof rather than to limit the number of forms which it can assume.

What I claim is:

1. In combination with a two-element alternating current relay having a plurality of local poles constantly energized by a local winding and a plurality of control poles energized by a control winding energizable by current out of phase with the current in the local winding for producing a rotating magnetic field; means retarding a portion of the flux produced by the energization of the local winding so that the retarded flux reacts with the unretarded flux produced by the local winding to provide a magnetic field shifting in the opposite direction to the rotating magnetic field; and a rotor inductively actuated by either the first or the second magnetic field.

2. In combination with a two-element alternating current relay having a distributed local constantly energized winding and a distributed control winding variably energized by current out of phase with the current in the local winding for producing a rotating magnetic field; means retarding a portion of the flux produced by the energization of the local winding so that the retarded flux reacts with the unretarded flux produced by the local winding to provide a shifting magnetic field shifting in the opposite direction to the rotating magnetic field; and a rotor inductively actuated in either direction according to the predominance of either the first or the second magnetic field.

3. In an alternating current relay, outer and inner stationary magnetic structures, an eddy-current rotor rotatable between the outer and inner magnetic structures, electro-magnetic means including a distributed first winding on the outer magnetic structure for operating the rotor in one direction, electro-magnetic means including said first winding and a second distributed winding on the outer magnetic structure for operating the rotor in a reverse direction, and contact means operated by the rotor.

4. In an alternating current relay, outer and inner stationary magnetic structures, and eddy-current rotor rotatable between the outer and inner magnetic structures, electro-magnetic means including a distributed first winding on the magnetic structure for operating the rotor in one direction from a single phase source of alternating current energy, electro-magnetic means including said first winding and a distributed second winding on the outer magnetic structure for operating the rotor in a reverse direction from said source of alternating current energy, and contact means operated by the rotor.

5. In a relay, a magnetic stator having a plurality of spaced local poles and a plurality of control poles spaced between the local poles, a flux retarding conductor surrounding a portion of each of the local poles, a winding on the local poles for, in combination with said flux retarding conductors, producing a magnetic field shifting in one direction when energized from an alternating current source, a winding on the control poles for, in combination with the winding on said local poles, producing a magnetic field rotating in an opposite direction when energized by alternating current out of phase with the current in the winding on the local poles, and a rotor inductively actuated by said magnetic fields.

6. In an alternating current relay, outer and inner stationary magnetic structures, a cup-shaped eddy-current rotor rotatable between the outer and inner magnetic structures, a source of alternating current, a distributed first winding on the outer magnetic structure continuously energized from the source of alternating current, means in the outer magnetic structure retarding a portion of the flux produced by the first winding to provide a shifting magnetic field to actuate said rotor in one direction, a distributed second winding on the outer magnetic structure selectively energized from the source of alternating current, and means providing a phase displacement between the current in the first winding and the current in the second winding to produce a rotating magnetic field to actuate said rotor in the opposite direction.

7. In an alternating current relay, a stator, a stationary magnetic core within the stator, flux retarding means in the stator, a constantly energized distributed winding on the stator associated with the flux retarding means for providing a magnetic field rotating shifting in one direction, a distributed control winding on the stator, means changing the phase relationship between current in the control winding and current in the constantly energized winding to provide a magnetic field rotating in the other direction, and an eddy-current induction rotor within the stator actuated by said magnetic fields.

8. In an alternating current relay, an eddy-current armature, electro-magnetic means including a first winding for operating the armature in one direction, electro-magnetic means including said first winding and a second winding for operating the armature in another direction, stop means limiting the operation of the armature in each direction, a pusher on the armature, contact means operated by the pusher and biasing the armature toward an intermediate position, said contact means and pusher being so relatively positioned as to exert a greater biasing force on the armature in one operated position than in the other operated position whereby to adjust the relay load curve to the torque curve.

9. In an alternating current relay, an eddy-current armature, electro-magnetic means including a distributed first winding for operating the armature in one direction, and electro-magnetic means including said first winding and a distributed second winding for operating the armature in the other direction.

10. In an alternating current relay, a local pole having a local coil thereon which is constantly energized, a control pole having a control coil thereon energizable by current out of phase with the current in the local coil and reacting with the local pole for producing a rotating field, means retarding a portion of the flux produced by current in the local coil so that the retarded flux reacts with the unretarded flux produced by the local coil to produce a magnetic field shifting in the opposite direction to the rotating magnetic field, and a rotor inductively actuated by either the first or the second magnetic field.

11. In an alternating current relay, a local pole having a local coil thereon which is constantly energized, a control pole having a control coil thereon energizable by current out of phase with the current in the local coil and reacting with the local pole for producing a rotating field, means retarding a portion of the flux produced by current in the local coil so that the retarded flux reacts with the unretarded flux produced by the local coil to produce a magnetic field shifting in the opposite direction to the rotating magnetic field, and a rotor inductively actuated in ether direction according to the predominance of either the first or the second magnetic field.

MARCIAN A. SCHEG.

DISCLAIMER 2,134,956.—*Marcian A. Scheg*, Rochester, N. Y. ALTERNATING CURRENT RELAY. Patent dated November 1, 1938. Disclaimer filed May 10, 1941, by the assignee, *General Railway Signal Company.*

Hereby enters this disclaimer by disclaiming from claims 1, 2, 3, 4, 5, 6, 7, 9, 10, and 11 any relay, except wherein a reduction or cessation in the normal current in its "control winding" (designated "control coil" in claims 10 and 11; "distributed second winding" in claims 3, 4, 6, and 9; and "winding on the control poles" in claim 5), and without any change in the direction of such current causes a reversal in the electromagnetic torque acting on the "rotor" (designated an "eddy current armature" in claim 9) and rotates said rotor from its normal position to a contact actuating position.

[*Official Gazette June 3, 1941.*]